United States Patent
Koch et al.

[11] Patent Number: 6,122,564
[45] Date of Patent: Sep. 19, 2000

[54] APPARATUS AND METHODS FOR MONITORING AND CONTROLLING MULTI-LAYER LASER CLADDING

[76] Inventors: Justin Koch, 31117 Lakeland Rd., Deer Creek, Ill. 61733; Jyoti Mazumder, 5074 Birkdale Dr., Ann Arbor, Mich. 48103

[21] Appl. No.: 09/107,912

[22] Filed: Jun. 30, 1998

[51] Int. Cl.[7] .................................................. G06F 19/00
[52] U.S. Cl. .......................................... 700/123; 700/166
[58] Field of Search ..................................... 700/123, 166, 700/119, 219, 182

[56] References Cited

U.S. PATENT DOCUMENTS

| | | | |
|---|---|---|---|
| 4,044,774 | 8/1977 | Corbin et al. | 607/117 |
| 4,323,756 | 4/1982 | Brown et al. | 219/121.66 |
| 4,411,258 | 10/1983 | Pujals, Jr. | 601/134 |
| 4,626,999 | 12/1986 | Bannister | 700/166 |
| 4,633,889 | 1/1987 | Talalla et al. | 607/117 |
| 4,724,299 | 2/1988 | Hammeke | 219/121.6 |
| 4,803,986 | 2/1989 | Dufresne et al. | 607/115 |
| 4,915,757 | 4/1990 | Rando | 156/64 |
| 5,031,618 | 7/1991 | Mullett | 607/46 |
| 5,041,974 | 8/1991 | Walker et al. | 607/63 |
| 5,196,015 | 3/1993 | Neubardt | 606/61 |
| 5,303,141 | 4/1994 | Batchelder et al. | 700/29 |
| 5,342,409 | 8/1994 | Mullet | 607/46 |
| 5,358,513 | 10/1994 | Powell, III et al. | 607/48 |
| 5,423,877 | 6/1995 | Mackey | 607/117 |
| 5,474,558 | 12/1995 | Neubardt | 606/79 |
| 5,501,703 | 3/1996 | Holscheimer et al. | 607/46 |
| 5,612,887 | 3/1997 | Laube et al. | 700/119 |
| 5,642,287 | 6/1997 | Sotiropoulos et al. | 700/166 |
| 5,643,330 | 7/1997 | Holscheimer et al. | 607/46 |
| 5,659,479 | 8/1997 | Duley et al. | 700/166 |
| 5,847,960 | 11/1998 | Lewis et al. | 219/121.63 |

OTHER PUBLICATIONS

E. Renier et al., CCD Technology Applied To Industrial Welding Applications, IEEE database, and pp. 1335–1338, May 1996.

R. Meriaudeau et al., Acquisition and Image Processing System Able To Optimize Laser Cladding Process, IEEE database, pp. 1628–1631, 1996.

Jyoti Mazumder, Advanced Lase Processing of Metals, IEEE database, pp. 23–25, unknown.

*Primary Examiner*—William Grant
*Assistant Examiner*—Chad Rapp
*Attorney, Agent, or Firm*—Gifford, Krass, Groh, Sprinkle, Anderson & Citkowski, PC

[57] ABSTRACT

Repetitive, laser-mediated cladding is used to accumulate the build-up of material on a substrate. The apparatus and methods of use are particularly useful in fabricating metal parts through as might be required for small volume manufacturing, prototype runs, and the like. The laser is used to locally heat a spot on a substrate, forming a melt pool into which material, preferably in powder form, is fed so as to create a deposit having a physical dimension. Optical detection means coupled to an optoelectric sensor are used to monitor a physical dimension of the deposit, and a feedback controller is operative to adjust the laser in accordance with the electrical signal, thereby controlling the rate of material deposition. In the preferred embodiment, the physical dimension is the height of the deposit, and the system further includes an interface to a computer-aided design (CAD) system including a description of an article to be fabricated, enabling the feedback controller to compare the physical dimension of the deposit to the description and adjust the energy of the laser in accordance therewith. The optical detection means preferably includes an apertured mask through which light from the deposit passes to reach the optoelectric sensor, and the feedback controller includes circuitry for adjusting the laser in accordance with the presence or absence of the light from the deposit.

25 Claims, 7 Drawing Sheets

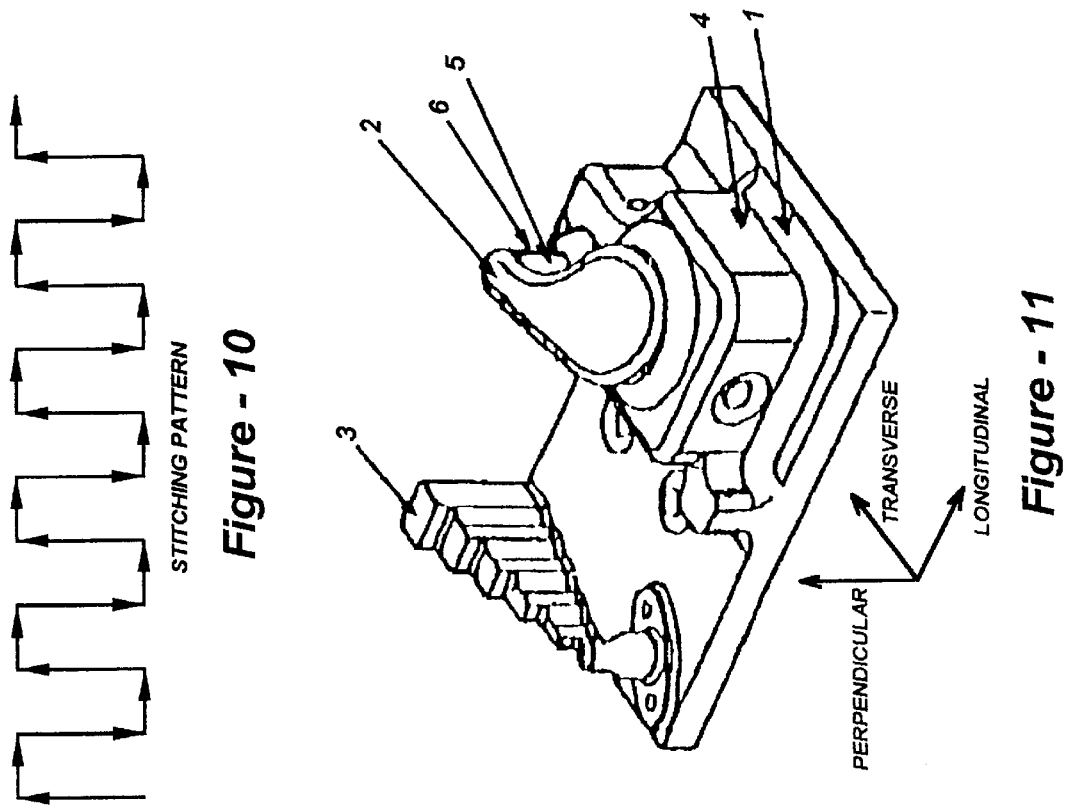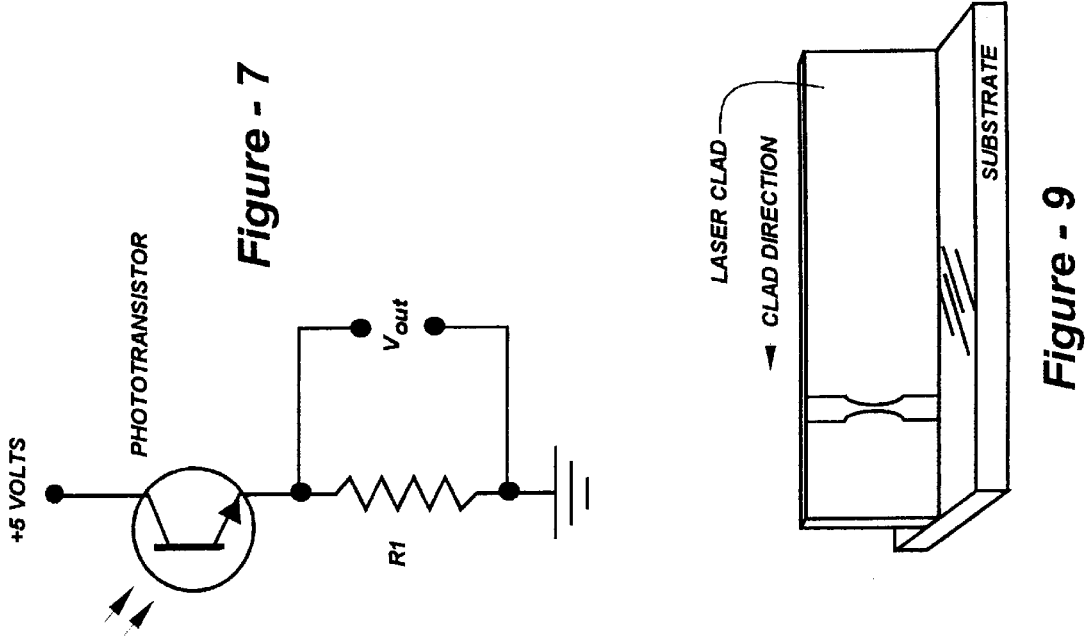

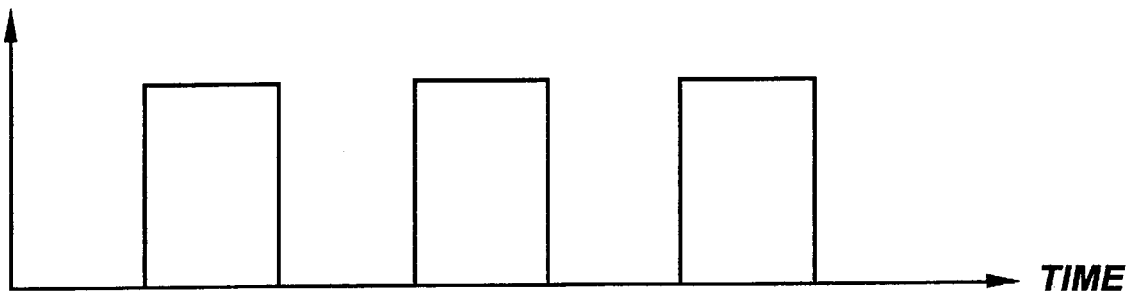
Fig. 8(a) Analog Voltage to Laser (Before Conditioning)
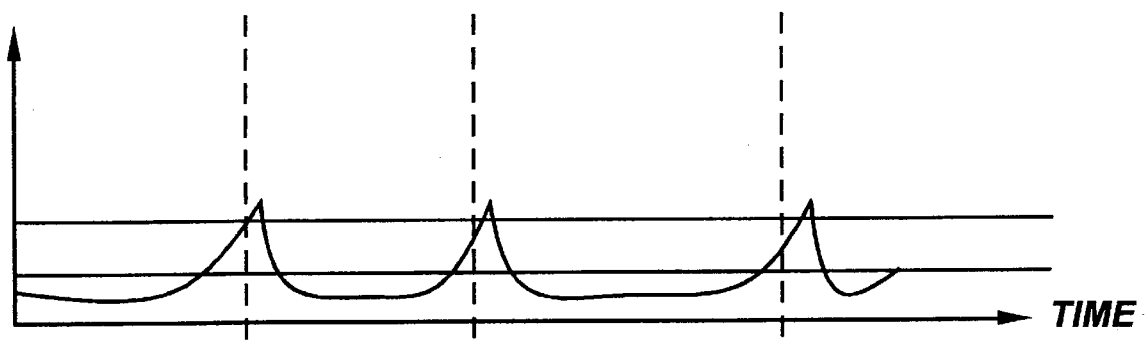
Fig. 8(b) Voltage Drop Across Phototransistor
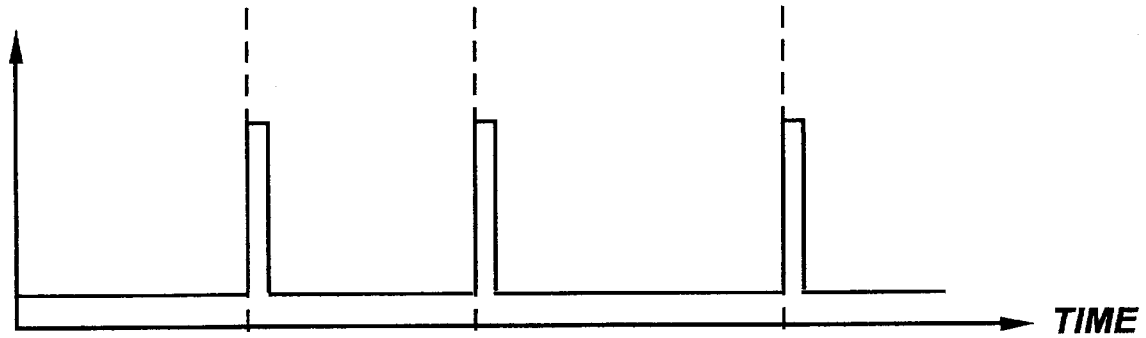
Fig. 8(c) Digitized Signal from Phototransistor
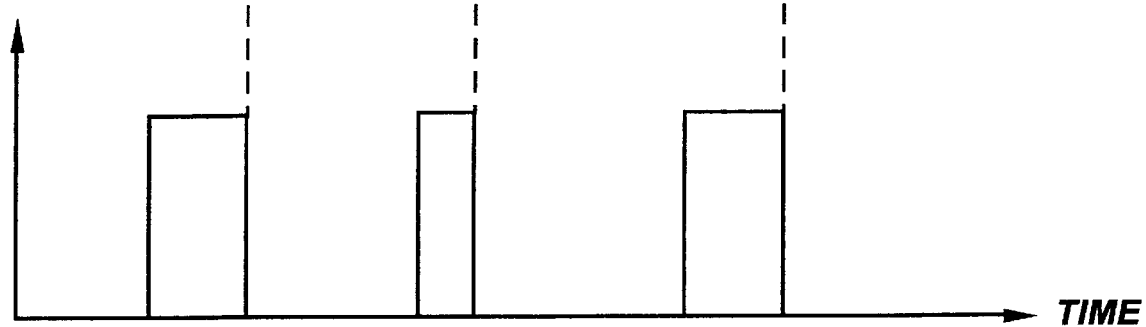
Fig. 8(d) Actual Signal Sent to Laser

APPARATUS AND METHODS FOR MONITORING AND CONTROLLING MULTI-LAYER LASER CLADDING

FIELD OF THE INVENTION

This invention relates to methods and apparatus for forming deposits of molten metal, called "melt pools," on the surface of a workpiece using a laser beam and a source of deposition metal, typically an injected powder metal or metal wire.

BACKGROUND OF THE INVENTION

Presently, one of the difficulties faced by manufacturers is the time lag between concept and development of a new technology and the introduction of actual products to the market. In manufacturing, a critical time-limiting step for many products is the design and fabrication of molds and dies. Complex dies may take from weeks to a year to perfect prior to manufacture of a product. In present manufacturing processes, added steps are necessary to overcome deficiencies of present fabrication methods. For example, for molds and dies, products must be machined to provide cooling channels and acceptable surface finish.

Known processes which deposit metal result in a sintered product, due to trapping of oxides and inadequately bonded material. Even in the case where acceptable material deposition has occurred, the process often entails the buildup of stresses which must be relieved. One such known process is laser cladding, wherein a laser is used to generate a melt-pool on a substrate material while a second material, typically a powder or wire, is introduced, melted, and metallurgically joined.

Cladding is generally distinguished from alloying on the basis that cladding melts a relatively small amount of the base substrate material relative to the amount of the deposited material, and the powder system delivers a controlled volume of metal particles into this molten volume. The particles become dispersed throughout this molten volume and form a deposition of a desired composition on the outer layer of the substrate. Removal of the laser beam from the molten volume, such as by advancement of the substrate workpiece relative to the focal point of the beam, causes the molten volume to be rapidly chilled. The chilling occurs so rapidly that the volume often retains the characteristics of the molten mix.

Conventional laser cladding techniques move the metal article relative to the focal point through the use of jigs, parts handlers, and the like. The beam focal point therefore remains fixed in space, as does the powdering point. Uniform movement of the metal article usually requires a complicated jig which is difficult to manufacture, very expensive, and usually not very successful, particularly with intricate geometries. For this reason, laser cladding of metal parts having other than relatively flat geometries have been nearly impossible to achieve on a consistent uniform basis. To the present time, it has not been possible to control the dimension and properties of the deposit. Close control of dimension is necessary in order to apply the basic cladding technique to the production of parts having close tolerances, acceptable microstructures and properties, and which can be produced at a reasonable cost and within a reasonable period of time.

The present invention is useful in automatically controlling the build-up of material on a substrate, and is particularly useful in fabricating metal parts through repetitive cladding operations as might be required for small volume manufacturing, prototype runs, and the like. Broadly, and in general terms, a laser is used to locally heat a spot on a substrate, forming a melt pool into which powder is fed to create a deposit having a physical dimension. Optical detection means coupled to an optoelectric sensor are used to monitor a physical dimension of the deposit, and a feedback controller is operative to adjust the laser in accordance with the electrical signal, thereby controlling the rate of material deposition.

In the preferred embodiment, the physical dimension is the height of the deposit, and the system further includes an interface to a computer-aided design (CAD) system including a description of an article to be fabricated, enabling the feedback controller to compare the physical dimension of the deposit to the description and adjust the energy of the laser in accordance therewith.

In terms of specific apparatus, the optical detection means preferably includes an apertured mask through which light from the deposit passes to reach the optoelectric sensor, and the feedback controller includes circuitry for adjusting the laser in accordance with the presence or absence of the light from the deposit.

A system for automatically fabricating an article according to unique features of the invention would comprise a computer-aided design database including a description of the article to be fabricated, a work table for supporting the substrate, and translation means for moving the substrate relative to the laser and feeding means. In one arrangement, the translation means moves the work table while the laser and feed means remain stationary, whereas, in a different configuration, the translation means moves the laser and feed means while the work table remains stationary. As a further alternative, both the laser/material feed and work table/substrate could be moved simultaneously, preferably under feedback control.

A process of fabricating an article according to a method aspect of the invention would include the following steps:
  providing a description of the article to be fabricated;
  providing a substrate upon which to form the article;
  heating a localized region of the substrate to form a melt pool thereon;
  feeding material into the melt pool so as to create a deposit having a physical dimension;
  optically monitoring the physical dimension of the deposit;
  controlling the physical dimension in accordance with the description of the article to be fabricated; and
  advancing to different localized region of the substrate until the fabrication of the article is completed.

BRIEF DESCRIPTION OF THE DRAWINGS

FIG. 7 is an electrical circuit diagram of a phototransistor biasing arrangement;

FIG. 8a is an analog voltage signal for the laser before conditioning and control by the feedback system;

FIG. 8b shows voltage drop across the transistor circuit as the result of height of deposit sensing;

FIG. 8c curve shows the digitized signal from the phototransistor sent to control the laser;

FIG. 8d shows the modified analog signal sent to the laser which affects the pulse duration and resultant power of the laser;

FIG. 9 illustrates a specific example of a monolithic structure formed by laser cladding on a substrate;

FIG. 10 is a graph of a preferred stitching pattern;

FIG. 11 is a perspective view of a benchmark sample including numbered residual stress management data points proposed by an international group of users.

DETAILED DESCRIPTION OF THE INVENTION

The present invention resides in methods and apparatus for monitoring and controlling the deposition of material on a substrate, typically a metal. In particular, the invention is applicable to processes based on the formation/sustaining of molten pool by localized laser heating, and the concurrent injection of powder, typically of metal. The materials of the substrate and injected stream are joined to form a deposit. In the unique system of the invention, at least one dimension of the deposit is monitored and controlled to provide a completed workpiece having a desired contour and dimensions within close tolerance. In particular, the size of the deposit is proportional to the amount of the second material injected into the melt-pool. The unique monitoring and control assembly of the invention comprises a feedback controller which senses a dimension of the deposit and varies the pulse duration of the laser beam based on the detected dimension. Preferably, the height of the deposit is sensed and power of the laser beam is controlled inversely with the height of the deposit.

The present invention combines direct metal deposition techniques along with automated direct feedback control to achieve a final product to within close tolerances and having acceptable metallurgical properties. The invention couples direct metal deposition (DMD) techniques with effective control to build parts, prototypes, molds and dies to close tolerances with complex geometries and good metallurgical characteristics. The invention also provides the ability to couple a CAD data base with direct metal deposition whereby a complete part may be fabricated with desired properties within a short period of time, and in an automated system with limited human intervention.

Figure 1:
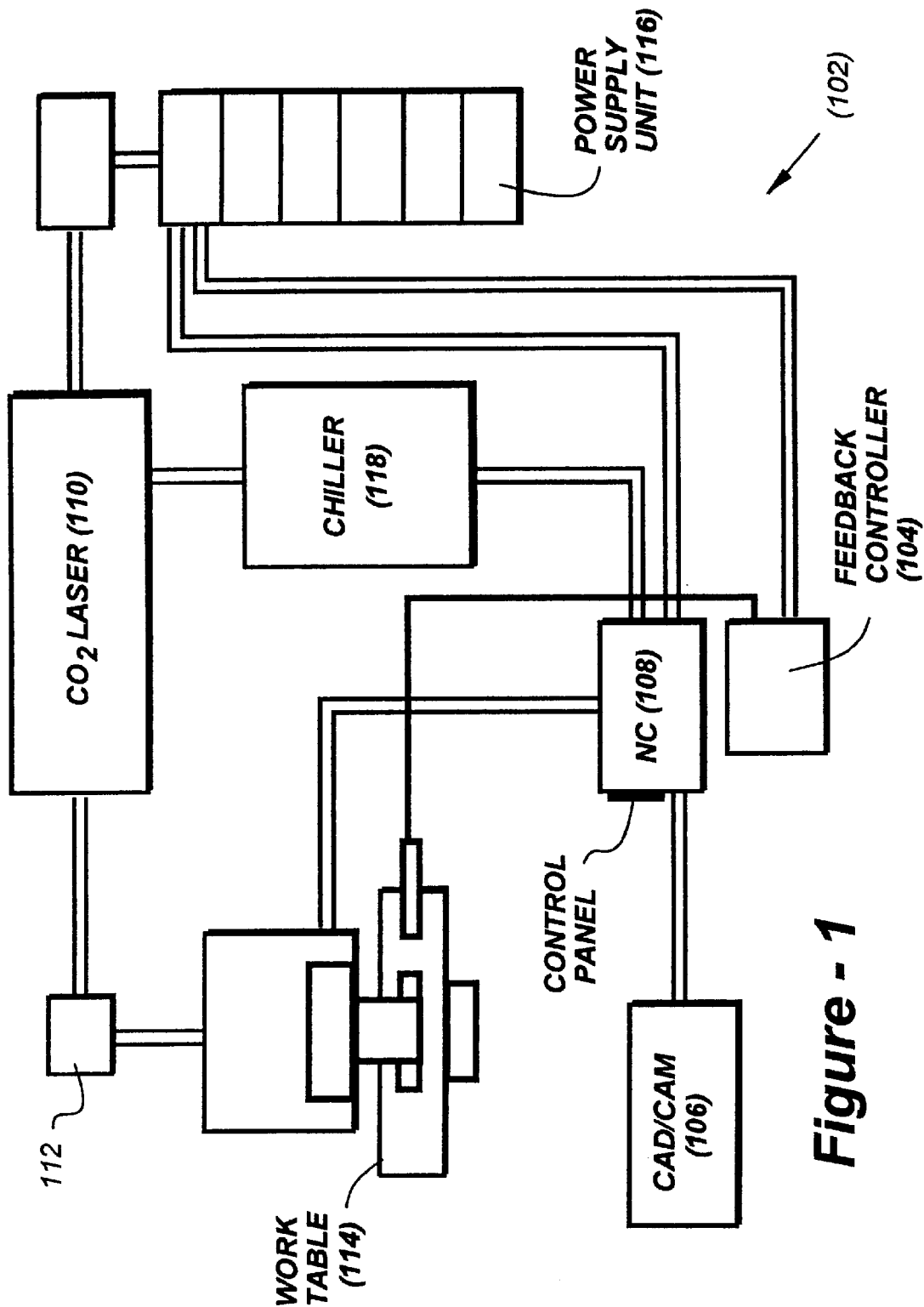
FIG. 1 is a schematic of a direct metal deposition system which includes the novel feedback controller of the invention and a CAD/CAM system for automated production of parts.

The invention will now be described with reference to the figures. FIG. 1 is a schematic of a direct metal deposition system 102 which includes a novel feedback controller 104 of the invention and a CAD/CAM system 106 for automated production of parts. The factors considered to affect the dimensions of material deposition, include laser power, beam diameter, temporal and spatial distribution of the beam, interaction time, and powder flow rate. Among such factors adequate monitoring and control of laser power has a critical effect on the ability to fabricate completed parts within control tolerances. Accordingly, the feedback controller 104 of the invention preferably cooperates directly with the numerical controller (NC) 108 which, itself, controls all functions of the system, including laser power.

Continuing the reference to FIG. 1, the system comprises a laser source 110 having an appropriate beam focusing means 112. The laser source is mounted above the substrate or workpiece in order to focus the beam thereon. The workpiece substrate is carried on the work table, though any of a number of variety of arrangements may be used to cause relative movement between the workpiece substrate and the laser spray nozzle. The system also includes a work table 114, power supply 116 and chiller 118 to cool the laser. It is preferred that the laser source be a continuous-wave or pulse $CO_2$, YAG, or any other wavelength laser having a power density enough to melt the material to be deposited. Typically, an RF-excited laser or high-power $CO_2$ laser is used. Preferably, the laser beam is directed roughly perpendicular to the surface of the substrate workpiece.

Figure 2:
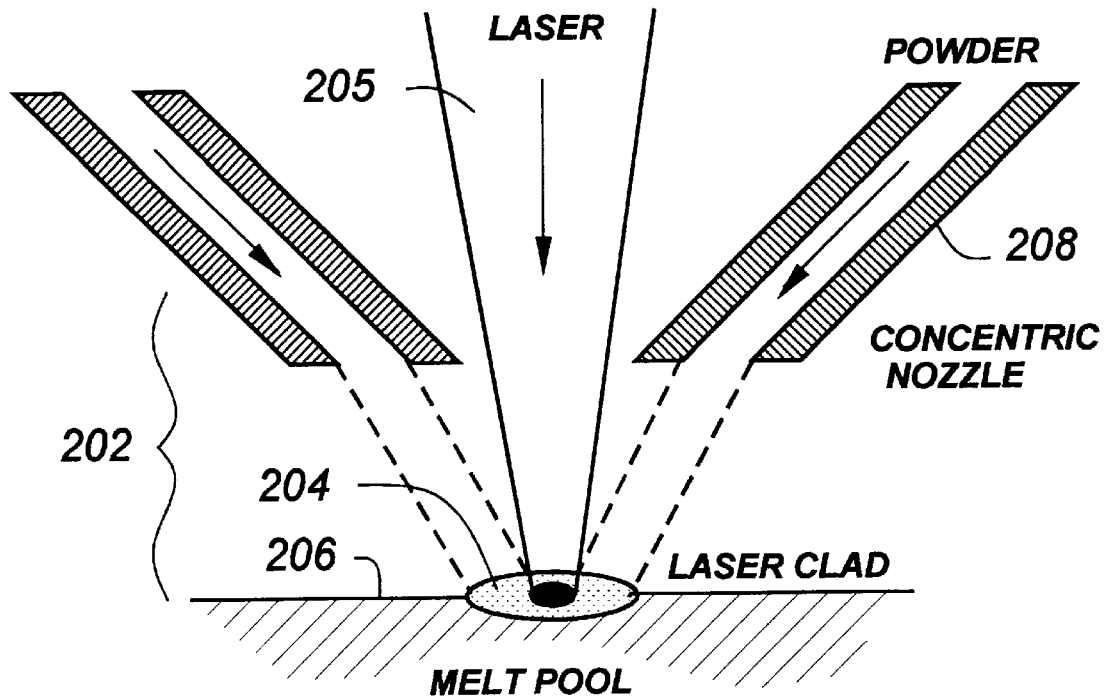
FIG. 2 is a schematic view of a laser spray nozzle forming a melt-pool on a substrate article.
Figure 3:
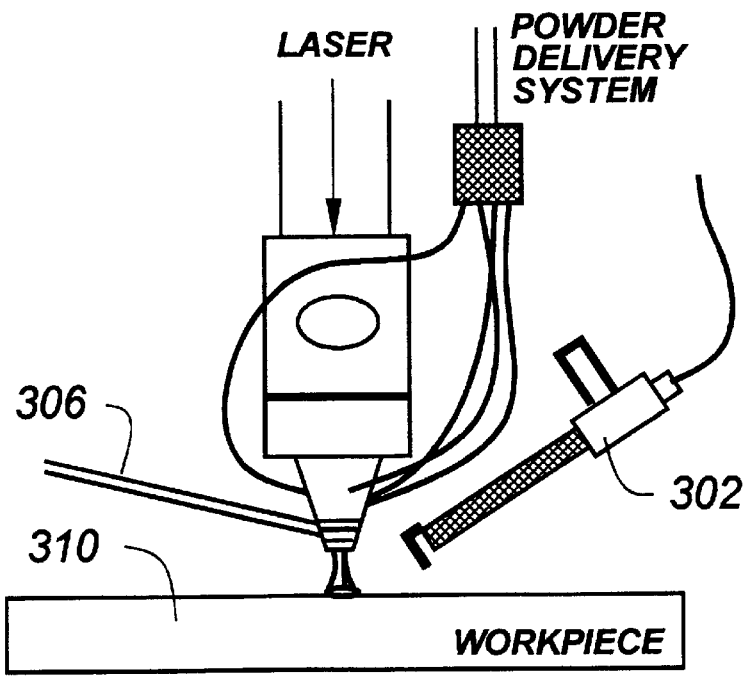
FIG. 3 is a schematic view of a laser spray nozzle forming a melt-pool on a substrate article, including an illustration of a portion of the feedback device of the invention.

As shown in FIGS. 2 and 3, the system includes a nozzle assembly 202 which operates on the workpiece to apply a cladding layer by injecting powdered metal into the beam. Laser and nozzle assemblies of this kind are described in U.S. Pat. Nos. 5,241,419 (Pratt, et al); 5,453,329 (Everett, et al); and 5,477,026 (Buongiomo). A suitable laser spray nozzle is available from Quantum Laser Corporation of Norcross, Ga., and is as described in U.S. Pat. No. 4,724,299.

The spray nozzle provides a common outlet for the beam and the powder so that both are consistently directed at the same point on the workpiece substrate. In a preferred configuration, the laser spray nozzle assembly includes a nozzle body with first and second spaced-apart end portions, as described in U.S. Pat. No. 4,724,299. A beam passageway extends between the end portions and permits a laser beam to pass therethrough. A housing which surrounds the second end portion is spaced from the second end portion so as to form an annular passage. The housing has an opening coaxial with the beam passageway for permitting the laser beam to pass therethrough. A cladding powder supply system is operably associated with the passage for supplying cladding powder thereto so that the powder exits the opening coaxial with the beam.

The laser spray nozzle of the invention achieves uniform clad composition because the beam exits the nozzle substantially coaxially with the cladding powder, both having the same focal point. The nozzle has a common outlet for the beam and the power so that both are consistently directed at the same point on the article. In this way, a common focal point is achieved which assures uniform clad composition. Similar results can also be obtained by side injection nozzle, however, side injection nozzle restricts the direction of clad movement whereas a concentric nozzle will allow change of direction of deposition at any instant.

Conventional laser cladding techniques move the metal article relative to the beam focal point through the use of jigs, parts handlers and the like. The beam focal point therefore remains fixed in space, as does the position of the injected powder metal stream. Uniform movement of the metal article usually requires a complicated jig which is difficult to manufacture, often expensive and frequently not very successful, particularly with extremely intricate geometries. For this reason, laser cladding of metal parts having intricate geometries has been difficult to achieve on a consistently uniform basis. Robots have become a standard piece of operating equipment in many metalworking plants. The typical robot has a wrist with five degrees of freedom, each of which can move with constant velocity. The robot may be powered electrically, hydraulically or pneumatically, or through some combination of these means. Utilization of a robot in conjunction with a laser cladding system helps toward means for achieving a uniform clad. The article may remain fixed in space and the nozzle may therefore move relative to the article in cooperation with movement of the robot arm. Alternatively, the nozzle may remain fixed and the article moved by the robot.

The numerical controller 108 preferably controls all operating components of the assembly of FIG. 1, including the conditions of operation of the laser, accepting direction from the CAD/CAM computer 106 for building the article, part or workpiece. The NC controller also receives feedback control signals from the feedback controller to adjust laser power output, and further controlling the relative position of the work table and the laser spray nozzle assembly. A numerical controller such as that utilized in FIG. 1 is obtainable from a number of vendors including FANUC, Allen Bradley, IGM, etc. The CAD/CAM system is of a conventional type and may comprise a work station supplied by any commercial vendor such as Sun Microsystems, Silicon Graphics, or Hewlett Packard. Among the features required of the CAD/CAM software is its ability to generate a path across the substrate for material deposition. This makes is possible to execute rapid prototyping and form a solid three-dimensional object directly from CAD dimensions, including the production of direct metal prototypes utilizing the laser spray nozzle.

As best seen in FIGS. 2 and 3, the laser spray nozzle 202 forms a melt-pool 204 on a substrate article 206. Powder is preferably injected through a nozzle 208 around the laser beam 205. It is preferred that the laser beam projection on the substrate surface not be Gaussian profile. It is preferred that the laser beam projection be of a relatively general doughnut shape with maximum intensity occurring peripherally. Thus, in contrast to a Gaussian profile, the midpoint of the beam profile has a lower intensity. This provides a melt-pool of relatively uniform temperature distribution. However, other spatial distributions of the laser beam can be adapted for the process.

FIG. 3 shows a schematic of a direct metal deposition system including a feedback control device 302. The energy delivered from the laser is shown by a large arrow, and a small arrow shows powder being delivered into the powder delivery system. Chilled water 306 is shown being delivered to the outlet of the laser spray nozzle. The feedback unit 302 is preferably disposed directly adjacent to the point where the laser and powder are incident on the surface of the workpiece 310.

Figure 4:
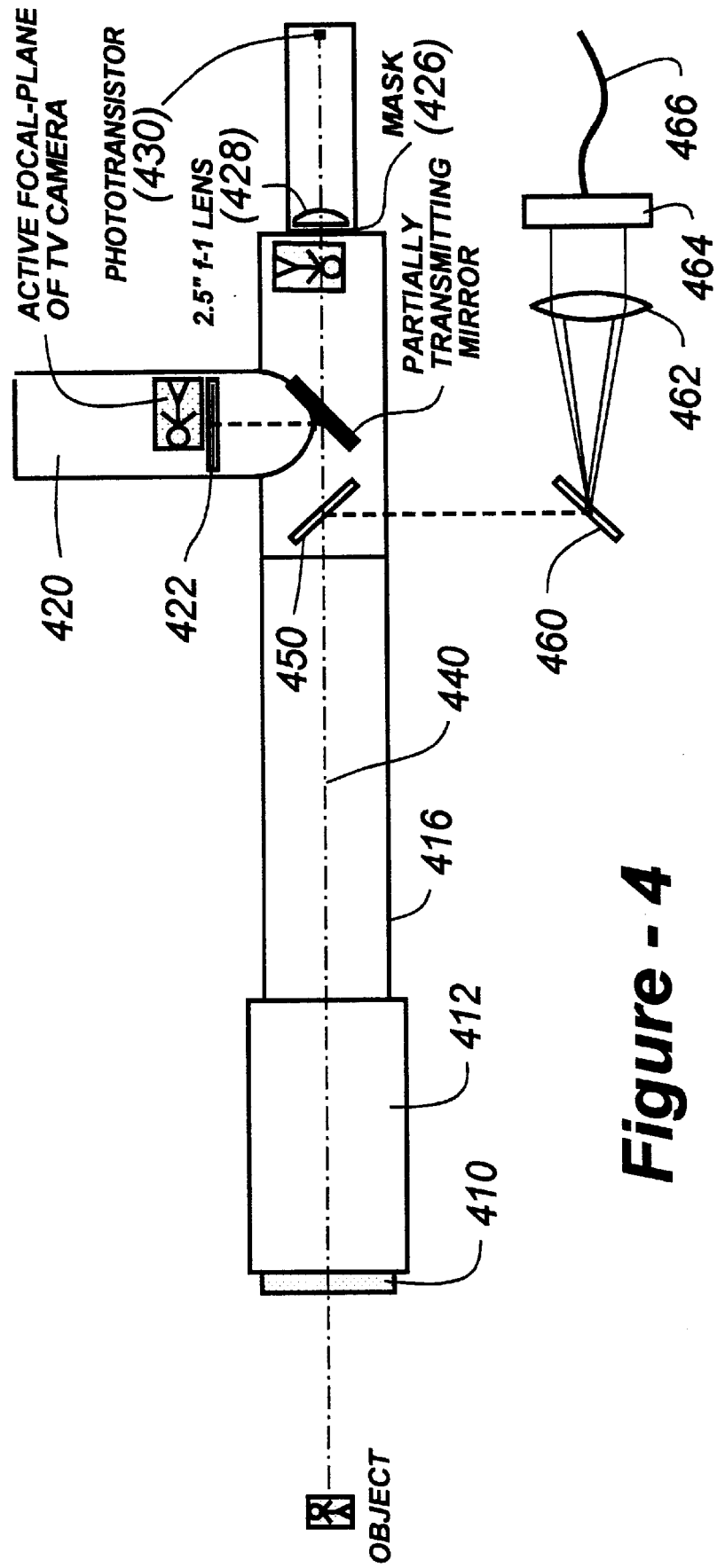
FIG. 4 is a schematic of an optical monitoring system which illustrates important features of a feedback controller of the invention.

FIG. 4 is a schematic of an optical monitoring system which illustrates the fundamental physics of the feedback control system. Broadly, a dimension such as the height of a laser-clad molten pool is monitored optically and controlled electronically. The high temperature molten surface of the molten pool emits with intensity in the infrared region. The stick figure of FIG. 4 schematically represents the molten pool. A narrow band-pass filter 410, preferably in the infrared, is placed in front of a camera lens 412. The exemplary camera comprises a 135 mm focal length with the only requirement being suitable magnification of the molten pool.

The image is passed through barrel extenders 416, after which a portion of the image (approximately 10 percent) is reflected to an active focal plane of a TV camera 420. Note that the camera is not strictly necessary according to the invention, but enables monitoring by a human operator. The reflected image preferably passes through a neutral density filter 422 placed between the reflector and the active focal plane of the TV camera. The transmissive portion of the optical image passes through the reflector, and the magnified image is masked at a focal plane to provide spatial resolution. The image exiting the mask 426 passes through a lens 428 and then to a light-sensitive device such as phototransistor 430.

Figure 5:
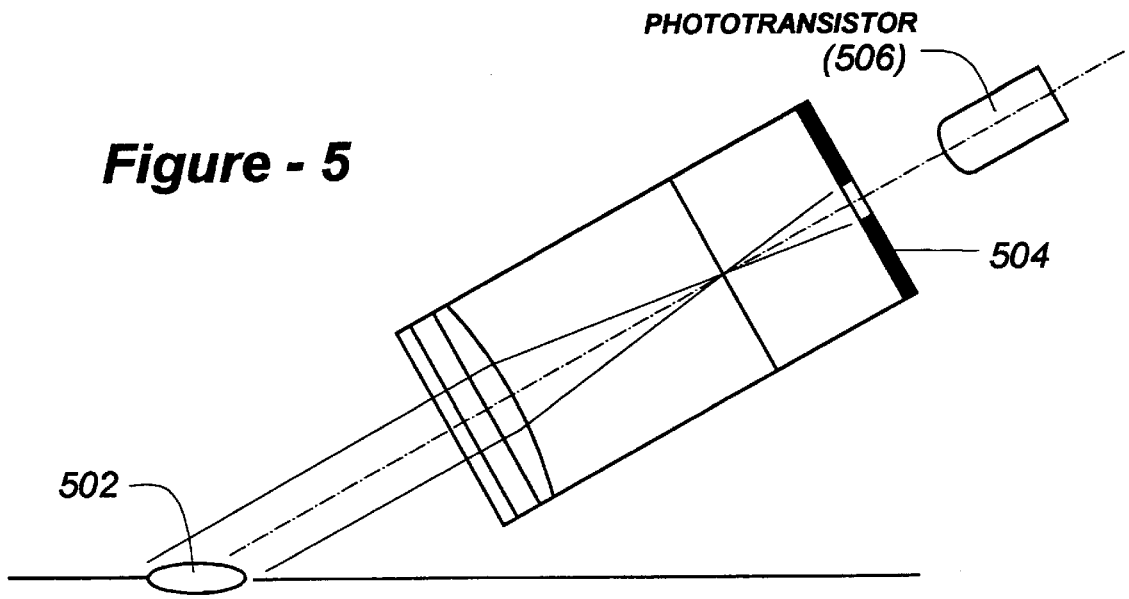
FIG. 5 is a schematic view of a molten pool, an optical axis, a mask, and the orientation of a phototransistor of the invention for sensing dimension.
Figure 6:
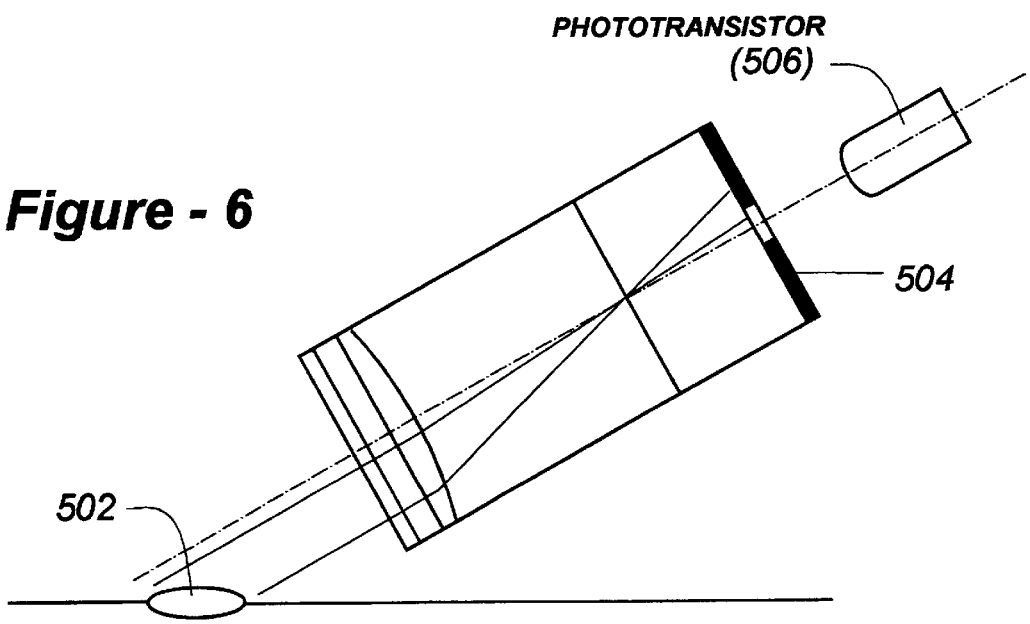
FIG. 6 is similar to FIG. 5, except that the sensing condition indicating whether distortion is occurring is reversed relative to that of FIG. 5, as are the mask and arrangement of the mask with respect to the deposited material.
Figure 12:
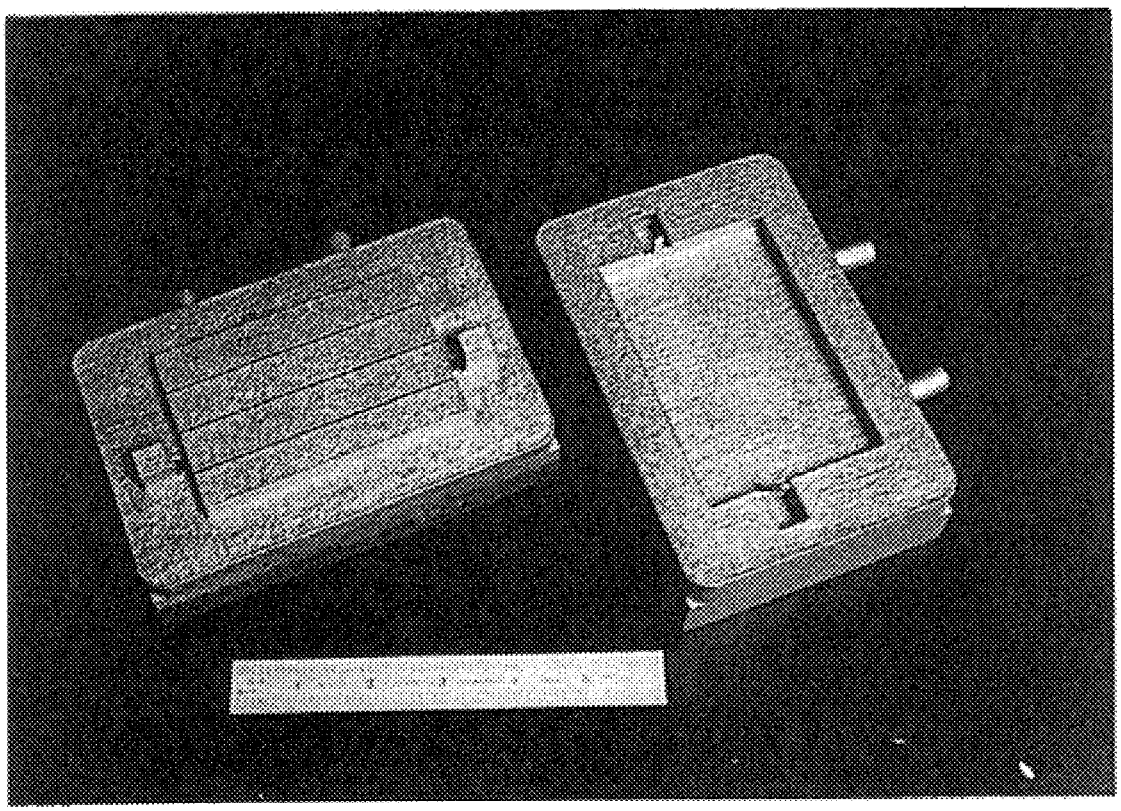
FIG. 12 is an illustration of a tool die having core and cavity parts prepared according to a method of the invention.

Importantly, the optical axis 440 angle and the magnification of this optical train are arranged such that small changes in the height of the clad can be distinguished by the phototransistor 430. With reference to the system orientations as shown in FIGS. 5 and 6, light from a defined molten pool height either is masked from, or allowed through to, the phototransistor. The sensitivity between the two conditions is preferably less than 0.010" (ten thousandths ($^{10}/_{1000}$") of an inch. That is, the threshold sensitivity between the two conditions is ~0.010"; the window of "unmasked" condition is ~0.100" before returning to masked" condition.

FIG. 4 also illustrates a way in which spectroscopic analysis may be incorporated into the invention through the use of a beamsplitter or partially transmitting mirror 450, which directs a portion of the light received from the object to a dispersive element 460 such as a diffraction grating, the light from which may be collimated by a lens 462 and fed to a detector 464 outputting spectral content information along line 466. Such spectral content information may be used to passively monitor and/or record data regarding the material composition of the melt-pool or cladding layer as it develops or, may be incorporated into a feedback loop to alter the operation of the system in accordance with material composition. For example, the constituency of the powder feed may be varied in accordance with design criteria and checked through the spectral analysis aspect to ensure that the proper alloy or change in material composition is taking place.

It should also be noted, that although laser power is preferably the variable modified in accordance with a stored program, other variables may be used separately or in conjunction with laser power. For example, the progression of the laser spot, or the size of the laser spot may be varied to meet the design criteria or, alternatively, material feed may be adjusted. Indeed, through proper control of the appropriate set of parameters, material removal is also made possible by the invention along with material build-up, enabling mistakes or imperfections to be corrected on-the-fly, or, alternatively, enabling the modification of pre-existing parts with respect to new design criteria.

The phototransistor signal is processed by a circuit which controls laser power. Most lasers possess the ability to be controlled by a single analog voltage signal, for example 0 volts and 12 volts will correspond to no-power, and full-power, respectively. Any voltage in between will generate a corresponding output power. Most lasers can respond to this analog voltage within a millisecond. The phototransistor is capable of detecting presence or absence of light, and its conductivity varies. On exposure to light, the conductivity of the phototransistor increases, and therefore the voltage drop across the phototransistor decreases. As shown in FIG. 7, the value of "R1" can be chosen to adjust the appropriate sensitivity so that $V_{PT}+V_{out}=5$ volts. In this particular example, 5 volts will provide 50 percent total power if total power is obtained with a 10 volt signal.

Referring to FIG. 5, a schematic of a molten deposit 502 is shown with a mask 504 disposed between the deposit and the phototransistor 506. Other elements of the system have been eliminated for clarity. As can be seen, the mask is in planar form and is a solid with a hole through which light may pass. When the height of the clad reaches a predetermined level, light in the form of the selected wavelength from the material of the deposit passes through the mask and is incident on the phototransistor, as shown. Conversely, as long as the level of the deposit is below the hole in the mask, light will not be incident on the phototransistor. This condition, between light and no light, can be used to control and adjust operation of the laser.

The opposite condition is shown in FIG. 6, where, as long as light is transmitted through the mask, the elevation of the clad deposit is acceptable; and as soon as light is prevented from being transmitted through the mask, an unacceptable condition is sensed, since no light is incident on the phototransistor. As height of molten pool changes in elevation, the image lowers until light begins to impinge upon the photo transistor. At some consistent height, the voltage ($V_{out}$) reaches a magnitude to switch from "beam on" to "beam off."

FIG. 8 is a series of curves showing the relationship of signals controlling laser operation, phototransistor response to light/no light condition in the form of voltage drop, and how the phototransistor signal controls laser power. In all cases, the horizontal axis represents time, and the vertical axis represents voltage. The first of curve of FIG. 8a shows an analog voltage signal for the laser before any conditioning and control by the feedback system of the invention. The second of FIG. 8b shows the voltage drop across the phototransistor resistor. As can be seen in the first curve, the analog voltage for the laser, before any control by the feedback system, is consistent and unadjusted with time. Referring to the second curve of FIG. 8, the voltage drop across the phototransistor resistor of FIG. 7 is shown during the cladding operation.

At the beginning of the cycle of operation, the impedance of the phototransistor is high, signifying that it is not sensing light emitted from the molten surface and transmitted through the selective narrow band-pass filter. As a result, the voltage drop across the phototransistor resistor is relatively low. In the condition where light is detected, there is shown a peak indicating that the impedance of the phototransistor is relatively low, and the voltage drop across the phototransistor resistor is also relatively high. In the third curve of FIG. 8c, the peak voltage drop across the phototransistor provides a signal which is digitized. The fourth curve of FIG. 8d shows that the digitized signal has now modified the actual signal sent to the laser and affects the pulse duration and resultant power of the laser. As shown in the fourth curve of FIG. 8, the voltage over time for the laser has now been adjusted corresponding to the phototransistor's voltage drop and sending of the monitored incident wavelength of light.

In the feedback aspect of the invention, the phototransistor sends a signal to the numerical controller of FIG. 1, which then adjusts voltage supply to the laser, controlling laser power, and finally adjusting laser duration incident on the workpiece substrate. The voltage of the analog signal corresponds to laser power. This enables direct metal deposition and control of the height of each pass, as layer upon layer of cladding is built up. The feedback system thus controls the accumulative dimensions of the workpiece. The feedback controller of the invention essentially tells the laser that if the workpiece is going off dimension, then the duration of "beam on" time for each pulse is to be reduced. When the beam is on, deposition occurs. If the particular location is too high, the feedback loop cuts off the laser power and greatly reduces deposition. The automated control and adjustment of the invention are critical since manual adjustments are not effective.

In use, the system may be used to deposit material, pixel by pixel. Without the feedback control, after several minutes or the accumulation of several layers the workpiece may become distorted, after which further deterioration of conditions may lead to distortion and destruction. The advantage of the feedback control system of the invention is that before distortion can occur, the phototransistor senses the condition of light/no light emitted at the unique wavelength of the workpiece material, and a computer is preprogrammed to reduce deposition until the feedback controller senses an acceptable condition where it permits pulses to extend their full amount.

EXAMPLE 1

For this research, a Chromium-Molybdenum hot work die steel, H13, was directly deposited onto substrates of wrought H13. This alloy, commonly used to die casting, was analyzed because of its potential, high-volume usefulness in the rapid-manufacturing of die casting tooling. Heat treat comparisons for both DMD and wrought H13 were performed in the following areas: 1) as clad hardness, ductility, and microstructure, 2) initial tempering response, and 3) tempering response for austenitized (at 1010° C.), oil-quenched material.

To replicate a commercial system, two cladding deposition modes were analyzed. A low power, low metal deposition rate was selected since this processing corresponds to the parameters used for details and edges. A high power, high metal deposition rate mode of operation was used since this corresponds to the method used for adding bulk material. These two forms of processing are referred to as fine and course cladding, respectively. The feedback system was used in the "fine" cladding.

The operating conditions used for coarse cladding consisted of a 1.1 mm focus spot rastered to 3.5 mm for the fabrication of a thick, 1-D, vertical wall. The laser power was 4500 watts and powder feed rate was 16 gm/min. The powder was delivered perpendicular to the raster direction. The beam and the powder flow were turned off at the end of each pass and subsequent layers were accumulated while translating 750 mm/min in the same direction. Successive layers were deposited to create a 3.5 mm wide, 70 mm tall, and 120 mm long build-up onto a low carbon steel substrate. During this processing, the temperature of the clad was not measured, but visible radiation was observed after the first 5–10 layers were deposited. A tensile bar oriented perpendicular to the clad direction, was machined from this "as-clad" specimen, as shown in FIG. 9. During tensile testing, an extensometer measured strain in the gage section.

For fine cladding, the metal powder and shroud gas were delivered concentrically. The molten pool was formed by a 0.6 mm diameter spot. The specimen velocity for both types of cladding processes was 750 mm/min. The laser power and powder feed rate were 1000 watts and 5 gm/min for the fine processing. A feedback system monitored the height of the molten pool as the specimen was traversed in a stitching pattern as shown in FIG. 10. The thickness of each deposited layer was 250 microns. The pattern was repeated to create a slab 90 mm high. H13 was used for both the substrate and clad to allow a direct comparison between the laser-clad and wrought material in the ensuing heat treating experiments.

Hardness and microstructure analysis of the clad workpiece and wrought H13, in the heat treated condition, are very similar. Both contained tempered martensite, and some retained austenite. After austenitizing at 1010° C. for one hour, most evidence of the dendritic solidification structure in the clad has been removed by diffusion. However, banding caused by alloy segregation was evident in the wrought substrate. The results of this analysis demonstrate that build-up of multiple layers by cladding, to form a workpiece having characteristics equivalent to a wrought conventional counterpart, is possible.

EXAMPLE 2

Management of residual stress and resultant distortion is a critical factor for the success of this process for demonstration of the capability of producing three-dimensional components. Residual stress accumulation is the biggest cause of cracking during the fabrication of tool steel components. In order to understand stress generation, a sample was designed to estimate the stress accumulation per layer. This resulted in a strategy to build up multiple layers before the accumulated residual stress could cause cracking. After deposition of a predetermined number of layers, stress relieving was carried out before further layers were deposited. This strategy led to successful fabrication of a full size IMS-T1 component as shown in FIG. 11. This is believed to be the first time for fabrication of this IMS-T1 test design in H13 tool steel by direct metal deposition.

The process parameters of Example 2 are given immediately below:

NSF T1 Sample material: H13 powder
laser power: ~100W
deposition rate: ~5 gr/min
slice thickness: 0.01"
real laser-on processing time: 50 hrs
total proc. time: ~100 hrs
stress relieving time: ~24 hrs (6×4 hrs)
Total time: ~124 hrs The fabricated sample was sent to an independent laboratory for residual stress measurement. FIG. 11 also shows the points where stress was measured. Locations 2, 6 & 5 were deposited during the last run and thus shows residual compressive stress, since they were not stress relieved. Other locations, deposited in earlier runs and subsequently stress relieved, showed negligible residual stress, whereas the maximum stress at the location without stress relieving is +49.4 KSI.

Injection molding dies with imbedded copper chill block and a water-cooling channel were prepared, and a trimming die was also fabricated. These components had very close dimensional accuracy, all with dimensional tolerance of a few thousandths of an inch. These examples show the feasibility of DMD process for successful fabrication of three-dimensional components with H13 alloy. The process is capable of controlling the microstructure and thus properties by carefully controlling process parameters. Heat treatment response of the laser deposited component and a wrought H13 steel component are the same. In fact, heat treated laser clad H13 is more structurally homogeneous than wrought H13.

The methods and apparatus of the invention provide the ability to establish and refine components of almost any geometry that can be produced from computer database. There are many important applications. One is rapid prototyping/manufacturing, which permits much faster turnaround times of either prototypes or manufacturing tools. Another application is for user-specific low volume parts production, where a small quantity can be produced in a cost-effective way. This is particularly advantageous for fabrication of medical devices, such as artificial prosthetic parts for individuals. Other potential applications include molds for polymer injection/fabrication, inserts for Al die casting molds with greatly reduced turnaround times, and layer glazing.

The invention provides the ability to control composition, microstructure, residual stresses, and mechanical properties. The system is capable of "lights off" manufacturing utilizing a feedback loop for process control and integrating hardware and software in the feedback control loop sensor for automated operation. Mathematical modeling is easily developed for different materials used in the process. Other features may easily be integrated into the system, including piezoelectric and electrical sensors for measurement of residual stress accumulation, strain and stress-induced distortion, and to monitor crack initiation.

What is claimed is:

1. A system for automatically controlling the layered deposition of material on a substrate, comprising:
   a controllable laser having a beam directed at a localized region of the substrate to form a melt pool thereon;
   means for feeding material into the melt pool to be melted by the laser so as to create a material deposit having a height;
   optical detection means coupled to an optoelectric sensor operative to output an electrical signal as a function of the height; and
   a feedback controller operative to automatically adjust the rate of material deposition as a function of the electric signal.

2. The system of claim 1, wherein the height is normal to the plane of the substrate.

3. The system of claim 1, wherein the optoelectric sensor outputs an electrical signal as a function of the material composition of the deposit.

4. The system of claim 1, further including an interface to a computer-aided design (CAD) system including a description of an article to be fabricated, and wherein the feedback controller is further operative to compare the height to the description and adjust the rate of material deposition in accordance therewith.

5. The system of claim 1, wherein the optical detection means includes an apertured mask through which light from the deposit passes to reach the optoelectric sensor, the feedback controller further including circuitry for detecting the presence or absence of the light from the deposit.

6. The system of claim 1, wherein the optical detection means includes a dispersive element optically coupled to a detector for determining the material composition of the deposit.

7. An automated laser cladding system for use in modifying an amount of material deposited on a substrate, comprising:
   a laser outputting a beam, including means for focussing the beam onto a localized area of the substrate, the laser having an energy of sufficient power to melt the substrate at least within the localized area;
   means for moving the beam and substrate relative to one another;
   means for feeding the material to be melted into the melt pool for accumulation into the localized area as a material deposit; and feedback control means operative to sense the height of the material deposit and automatically adjust the rate of material deposition in accordance with the height.

8. The system of claim 7, wherein the feedback control means adjusts the power of the beam to adjust the rate of material deposition.

9. The system of claim 7, wherein the feedback control means adjusts the spot size of the beam to adjust the rate of material deposition.

10. The system of claim 7, wherein the feedback control means adjusts the rate of material feed to adjust the rate of material deposition.

11. The system of claim 7, wherein the feedback control means adjust the rate of movement as between the beam and the substrate to adjust the rate of material deposition.

12. The system of claim 7, wherein the feedback control means further senses the chemical composition of the material deposit above the substrate.

13. The system of claim 7, wherein the feedback control means further senses the chemical composition of the melt pool.

14. The system of claim 7, further including an interface to a computer-aided design (CAD) system, the CAD system including a description of a part to be fabricated, and wherein the feedback control means is further operative to compare the height to the description and automatically adjust the rate of material deposition in accordance therewith.

15. A system for automatically fabricating an article, comprising:
   a computer-aided design database including a description of the item to be fabricated;
   a work table for supporting a substrate;
   a controllable laser having a beam directed at a localized region of the substrate to form a melt pool thereon;
   means coupled to the laser for feeding material to be melted into the melt pool so as to create a material deposit having a height;
   translation means for moving the substrate relative to the laser and feeding means;
   optical detection means operative to output an electrical signal indicative of the height of the material deposit as it is being created; and
   a feedback controller operatively interfaced to the translation means and laser to automatically adjust the height of the material deposit in accordance with the description of the article to be fabricated in the computer-aided design database.

16. The system of claim 15, wherein the translation means moves the work table while the laser and feed means remain stationary.

17. The system of claim 15, wherein the translation means moves the laser and feed means while the work table remains stationary.

18. The system of claim 15, wherein the substrate is metallic and the material fed into the melt pool is a metallic powder.

19. The system of claim 15, wherein the optical detection means includes an apertured mask through which light from the material deposit passes to reach the optoelectric sensor.

20. A method for fabricating an article, comprising the steps of:
   a) providing a description of the article to be fabricated;
   b) providing a substrate upon which to form the article;
   c) providing a controllable laser having a beam to heat a localized region of the substrate to form a melt pool thereon;
   d) feeding material into the melt pool so as to create a material deposit having a height;
   e) optically monitoring the height of the material deposit;
   f) automatically controlling the height in accordance with the description of the article to be fabricated;
   g) advancing to a different localized region of the substrate; and
   h) repeating steps c) through g) until the fabrication of the article is complete.

21. The method of claim 20, wherein step g) includes moving the substrate while the laser and feed means remain stationary.

22. The method of claim 20, wherein step g) includes moving the laser and feed means while the substrate remains stationary.

23. The method of claim 20, wherein the substrate is metallic and the material fed into the melt pool is a metallic powder.

24. The method of claim 20, wherein step g) includes tilting the substrate while the laser and feed means remain stationary.

25. The method of claim 20, wherein the height is normal to the substrate.

* * * * *